US008188172B2

(12) United States Patent
Elango et al.

(10) Patent No.: US 8,188,172 B2
(45) Date of Patent: *May 29, 2012

(54) POLYESTER COMPOSITIONS, METHOD OF MANUFACTURE, AND USES THEREOF

(75) Inventors: Somasundaram Elango, Karnataka (IN); Rama Konduri, Evansville, IN (US); Subodh Kumar Pal, Karnataka (IN); Reema Sinha, Karnataka (IN); Veeraraghavan Srinivasan, Karnataka (IN); Chris van der Weele, Sommelskijk (NL); Gerrit de Wit, Ossendrecht (NL)

(73) Assignee: Sabic Innovative Plastics IP B.V. (NL)

( * ) Notice: Subject to any disclaimer, the term of this patent is extended or adjusted under 35 U.S.C. 154(b) by 728 days.

This patent is subject to a terminal disclaimer.

(21) Appl. No.: 11/870,896

(22) Filed: Oct. 11, 2007

(65) Prior Publication Data

US 2009/0036578 A1 Feb. 5, 2009

Related U.S. Application Data

(63) Continuation-in-part of application No. 11/012,800, filed on Dec. 15, 2004.

(60) Provisional application No. 60/942,806, filed on Jun. 8, 2007, provisional application No. 60/530,147, filed on Dec. 17, 2003.

(51) Int. Cl.
C08K 5/5313 (2006.01)

(52) U.S. Cl. .......... 524/126; 524/99; 524/100; 524/101; 524/133

(58) Field of Classification Search ............ 524/99–101, 524/126, 133
See application file for complete search history.

(56) References Cited

U.S. PATENT DOCUMENTS

| | | | |
|---|---|---|---|
| 2,465,319 A | 3/1949 | Whinfield | |
| 3,047,539 A | 7/1962 | Pengilly | |
| 3,671,487 A | 6/1972 | Abolins | |
| 3,907,868 A | 9/1975 | Currie et al. | |
| 3,953,394 A | 4/1976 | Fox et al. | |
| 3,953,404 A | 4/1976 | Borman | |
| 4,096,156 A | 6/1978 | Freudenberger et al. | |
| 4,141,927 A * | 2/1979 | White et al. | 525/432 |
| 4,180,494 A | 12/1979 | Fromuth et al. | |
| 4,254,011 A | 3/1981 | Bier | |
| 4,504,613 A * | 3/1985 | Abolins et al. | 524/125 |
| 4,506,043 A | 3/1985 | Ogawa et al. | |
| 4,940,745 A | 7/1990 | Lausberg et al. | |
| 4,954,540 A | 9/1990 | Nakane et al. | |
| 4,983,660 A | 1/1991 | Yoshida et al. | |
| 5,385,970 A | 1/1995 | Gallucci et al. | |
| 5,684,071 A | 11/1997 | Mogami et al. | |
| 5,955,565 A | 9/1999 | Morris et al. | |
| 6,013,707 A | 1/2000 | Kleiner et al. | |
| 6,068,935 A | 5/2000 | Hayami et al. | |
| 6,111,031 A | 8/2000 | Puyenbroek et al. | |
| 6,150,473 A * | 11/2000 | Brown et al. | 525/423 |
| 6,166,114 A | 12/2000 | Cosstick et al. | |
| 6,255,371 B1 | 7/2001 | Schlosser et al. | |
| 6,420,459 B1 | 7/2002 | Horold | |
| 6,429,243 B1 | 8/2002 | Okamoto et al. | |
| 6,503,988 B1 | 1/2003 | Kitahara et al. | |
| 6,531,530 B2 | 3/2003 | Asano | |
| 6,538,054 B1 | 3/2003 | Klatt et al. | |
| 6,547,992 B1 | 4/2003 | Schlosser et al. | |
| 6,569,928 B1 | 5/2003 | Levchik et al. | |
| 6,927,275 B2 | 8/2005 | Hirokane et al. | |
| 7,105,589 B2 | 9/2006 | Geprags | |
| 7,169,836 B2 * | 1/2007 | Harashina et al. | 524/116 |
| 7,498,368 B2 | 3/2009 | Harashina et al. | |
| 7,649,040 B2 | 1/2010 | Choate, Jr. et al. | |
| 2001/0007888 A1 | 7/2001 | Asano | |
| 2001/0009944 A1 | 7/2001 | Chisholm et al. | |
| 2002/0096669 A1 | 7/2002 | Van Der Spek et al. | |
| 2002/0123566 A1 | 9/2002 | Georgiev et al. | |
| 2003/0018107 A1 | 1/2003 | Heinen et al. | |
| 2004/0192812 A1 | 9/2004 | Engelmann et al. | |
| 2005/0137297 A1 | 6/2005 | De Wit | |
| 2005/0143503 A1 | 6/2005 | Bauer et al. | |

(Continued)

FOREIGN PATENT DOCUMENTS

DE 19904814 A1 8/2000

(Continued)

OTHER PUBLICATIONS

DE19904814, Publication Date: Aug. 10, 2000, Abstract, 1 page.

(Continued)

Primary Examiner — Peter Szekely
(74) Attorney, Agent, or Firm — Cantor Colburn LLP; Diderico van Eyl

(57) ABSTRACT

A composition is described, comprising: (a) from 20 to 80 wt % of a polyester; (b) from 5 to 35 wt % of a flame retardant phosphinate of the formula (I)

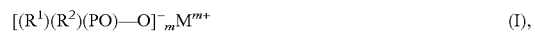

$$[(R^1)(R^2)(PO)-O]^-_m M^{m+} \quad (I),$$

a flame retardant diphosphinate of the formula (II)

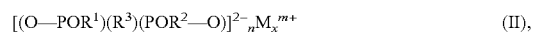

$$[(O-POR^1)(R^3)(POR^2-O)]^{2-}_n M_x^{m+} \quad (II),$$

and/or a flame retardant polymer derived from the flame retardant phosphinate of the formula (I) or the flame retardant diphosphinate of the formula (II), wherein $R^1$ and $R^2$ are identical or different and are H, $C_1$-$C_6$-alkyl, linear or branched, or $C_6$-$C_{10}$-aryl; $R^3$ is $C_1$-$C_{10}$-alkylene, linear or branched, $C_6$-$C_{10}$-arylene, -alkylarylene or -arylalkylene; M is an alkaline earth metal, alkali metal, Al, Ti, Zn, Fe, or boron; m is 1, 2, 3 or 4; n is 1, 2, or 3; and x is 1 or 2; (c) from 1 to 25 wt % of a melamine polyphosphate, melamine cyanurate, melamine pyrophosphate, and/or melamine phosphate; (d) from more than 0 to 25 wt % of a polyetherimide; and (e) optionally, an additive.

45 Claims, No Drawings

U.S. PATENT DOCUMENTS

| | | |
|---|---|---|
| 2005/0154099 A1 | 7/2005 | Kobayashi et al. |
| 2005/0272839 A1 | 12/2005 | Bauer et al. |
| 2006/0058431 A1 | 3/2006 | Cartier et al. |
| 2006/0247339 A1 | 11/2006 | Harashina et al. |
| 2007/0049667 A1 | 3/2007 | Kim et al. |
| 2007/0161725 A1 | 7/2007 | Janssen |
| 2008/0090950 A1 | 4/2008 | Costanzi et al. |
| 2008/0139711 A1 | 6/2008 | Borade et al. |
| 2008/0242789 A1 | 10/2008 | Zhu et al. |
| 2008/0269383 A1 | 10/2008 | Pauquet et al. |
| 2009/0124733 A1 | 5/2009 | Haruhara et al. |
| 2009/0203871 A1 | 8/2009 | Maruyama et al. |

FOREIGN PATENT DOCUMENTS

| | | |
|---|---|---|
| EP | 0146104 A2 | 6/1985 |
| EP | 0400935 A2 | 5/1990 |
| EP | 0672717 A1 | 9/1995 |
| EP | 0919591 | 6/1999 |
| EP | 0919591 A1 | 6/1999 |
| EP | 1024168 A1 | 8/2000 |
| EP | 1070754 | 1/2001 |
| EP | 1070754 A2 | 1/2001 |
| EP | 1522551 | 4/2005 |
| EP | 1544237 | 6/2005 |
| EP | 1607400 | 12/2005 |
| EP | 1967549 A1 | 9/2008 |
| WO | 9902606 A1 | 1/1999 |
| WO | 9965987 | 12/1999 |
| WO | 0049077 | 8/2000 |
| WO | 0121698 | 3/2001 |
| WO | 01/81470 A1 | 11/2001 |
| WO | 2005059018 | 6/2005 |
| WO | 2007/084538 A2 | 7/2007 |
| WO | 2008/011940 A1 | 1/2008 |
| WO | 2008/014254 A2 | 1/2008 |
| WO | 2008/014273 A1 | 1/2008 |

OTHER PUBLICATIONS

Cooper, et al., "Life Cycle Engineering Guidelines," EPA 600/R-01/101, Risk Management Research, pp. 1-100 (2001).

ASTM Designation: D 256-06, "Standard Test Methods for Determining the Izod Pendulum Impact Resistance of Plastics," pp. 1-20 (2006).

ASTM Designation: D 648-06, "Standard Test Method for Deflection Temperature of Plastics Under Flexural Load in the Edgewise Position," pp. 1-13 (2006).

International Standard: ISO 180, "Plastics—Determination of Izod Impact Strength," pp. 1-16 (2000).

International Standard: ISO 527-1, "Plastics—Determination of Tensile Properties," pp. 1-54 (1993).

UL 94, "Tests for Flammability of Plastic Materials for Parts in Devices and Appliances," 52 pgs., (Dec. 12, 2003).

European Patent Office, PCT International Search Report, International Application No. PCT/US2008/06603, Date of Mailing: Mar. 12, 2009.

European Patent Office, PCT Written Opinion of the ISA, International Application No. PCT/US2008/06603, Date of Mailing: Mar. 12, 2009.

International Search Report and Written Opinion; International Application No. PCT/US2008/066599; International Filing Date Jun. 11, 2008; Date of Mailing Mar. 2, 2009; Docket No. P09-0030US2; 12 pages.

International Search Report and Written Opinion; International Application No. PCT/US2004/042202; International Filing Date Dec. 16, 2004; Date of Mailing Mar. 9, 2005; Docket No. P29-0153US; 12 pages.

International Preliminary Report on Patentability; International Application No. PCT/US2004/042202; International Filing Date Dec. 16, 2004; Date of Mailing Jun. 20, 2006; Docket No. P29-0153US; 5 pages.

* cited by examiner

POLYESTER COMPOSITIONS, METHOD OF MANUFACTURE, AND USES THEREOF

CROSS REFERENCE TO RELATED APPLICATIONS

This application claims priority to U.S. Provisional Application No. 60/942,806 filed Jun. 8, 2007; this application is also a continuation-in-part of U.S. application Ser. No. 11/012,800, filed on Dec. 15, 2004, which claims priority to U.S. Provisional Application No. 60/530,147 filed on Dec. 17, 2003, all of which are incorporated herein by reference in their entirety.

BACKGROUND

Thermoplastic polyester compositions, such as poly(alkylene terephthalates), have valuable characteristics including strength, toughness, high gloss, and solvent resistance. Polyesters therefore have utility as materials for a wide range of applications, from automotive parts to electric and electronic appliances. Because of their wide use, particularly in electronic applications, it is desirable to provide flame retardancy to polyesters. One set of test conditions commonly accepted and used as a standard for flame retardancy is set forth in Underwriters Laboratories, Inc. Bulletin 94, which prescribes certain conditions by which materials are rated for self-extinguishing characteristics. Another set of conditions commonly accepted and used (especially in Europe) as a standard for flame retardancy is the Glow Wire Ignition Test (GWIT), performed according to the International standard IEC 695-2-1/2.

Numerous flame retardants for polyesters are known, but many contain halogens, usually chlorine and/or bromine. Halogenated flame retardant agents are less desirable because of the increasing demand for ecologically friendly ingredients. Halogen-free flame retardants, such as phosphorus- and nitrogen-based compounds can be used as well. Unfortunately, they are lack good flame retardancy for thin sections.

There is a need for polyester compositions having the combination of good flame retardant properties not only at thicknesses of 1.5 mm or greater, but also at thicknesses of 0.8 mm or less. It would be advantageous if this combination of flame retardant properties could be achieved while at least essentially maintaining mechanical properties and/or heat properties.

SUMMARY

One or more of the above described drawbacks and disadvantages can be alleviated or minimized by a composition comprising: (a) from 20 to 80 wt % of a polyester; (b) from 5 to 35 wt % of a flame retardant phosphinate of the formula (I)

a flame retardant diphosphinate of the formula (II)

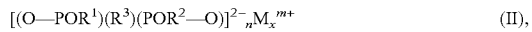

and/or a flame retardant polymer derived from the flame retardant phosphinate of the formula (I) or the flame retardant diphosphinate of the formula (II), wherein $R^1$ and $R^2$ are identical or different and are H, $C_1$-$C_6$-alkyl, linear or branched, or $C_6$-$C_{10}$-aryl; $R^3$ is $C_1$-$C_{10}$-alkylene, linear or branched, $C_6$-$C_{10}$-arylene, -alkylarylene or -arylalkylene; M is an alkaline earth metal, alkali metal, Al, Ti, Zn, Fe, or boron; m is 1, 2, 3 or 4; n is 1, 2, or 3; and x is 1 or 2; (c) from 1 to 25 wt % of a melamine polyphosphate, melamine cyanurate, melamine pyrophosphate, and/or melamine phosphate; (d) from more than 0 to 25 wt % of a polyetherimide; and (e) optionally, an additive.

In another embodiment, a method for the manufacture of a composition comprises blending the components of the above-described composition.

Also described is an article comprising the above-described composition/

A method of forming an article comprises shaping, extruding, calendaring, or molding the above-described composition to form the article.

In still another embodiment, a composition consists essentially of, based on the total weight of the composition: from 35 to 65 wt % of a poly(1,4-butylene terephthalate); from 5 to 25 wt % of a flame retardant phosphinate of the formula (Ia)

a flame retardant diphosphinate of the formula (IIa)

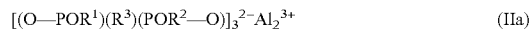

and/or a flame retardant polymer derived from formula (Ia) or (IIa), wherein $R^1$ and $R^2$ are identical or different and are H, $C_1$-$C_6$-alkyl, linear or branched, or $C_6$-$C_{10}$-aryl; $R^3$ is $C_1$-$C_{10}$-alkylene, linear or branched, $C_6$-$C_{10}$-arylene, -alkylarylene or -arylalkylene; from 1 to 25 wt % of melamine polyphosphate and/or melamine cyanurate; from 0.1 to 25 wt % of an aromatic polyetherimide; and from 15 to 45 wt % of a reinforcing filler, wherein a molded sample comprising the composition has a tensile strength at yield from 90 to 120 MPa measured in accordance with ISO 527, and an unnotched Izod impact strength from to 25 to 50 KJ/m² measured at 23° C. in accordance with ISO 180, and a 0.8 mm thick molded sample comprising the composition has a UL-94 flammability rating of V0.

In still another embodiment, a composition consists essentially of, based on the total weight of the composition: from 40 to 65 wt % of a poly(1,4-butylene terephthalate) having a weight average molecular weight of 45,000 a.m.u. or greater, as determined by gel permeation chromatography with a polystyrene standard; from 7 to 20 wt % of a flame retardant phosphinate of the formula (Ia)

a flame retardant diphosphinate of the formula (IIa)

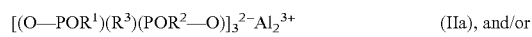

a flame retardant polymer comprising formula (Ia) or (IIa), wherein $R^1$ and $R^2$ are identical or different and are H, $C_1$-$C_6$-alkyl, linear or branched, or $C_6$-$C_{10}$-aryl; $R^3$ is $C_1$-$C_{10}$-alkylene, linear or branched, $C_6$-$C_{10}$-arylene, -alkylarylene or -arylalkylene; from 2 to 8 wt % of melamine polyphosphate and/or melamine cyanurate; from 2 to 8 wt % of an aromatic polyetherimide; and from 20 to 35 wt % of a reinforcing filler.

DETAILED DESCRIPTION OF THE PREFERRED EMBODIMENTS

According to an embodiment, a composition comprises a polyester such as a poly(butylene terephthalate); a nitrogen-containing flame retardant selected from the group consisting of at least one of a triazine, a guanidine, a cyanurate, an isocyanurate, and mixtures thereof; a phosphinic acid salt of formula I and/or diphosphinic acid salt of formula II and/or their polymers as described below; and a charring polymer.

In another embodiment, it has been found that use of a polyester in combination with a specific amount of a metal phosphinate salt, a particular nitrogen-containing flame retardant (melamine polyphosphate, melamine cyanurate, melamine pyrophosphate, and/or melamine phosphate) and up to 25 wt % of a polyetherimide, provides compositions that have excellent flame retardancy for both thick and thin articles. The flame retardancy can be obtained in the absence of a halogenated organic flame retardant. The compositions can further have very good mechanical properties, in particular impact strength, tensile properties, and/or heat stability.

As used herein the singular forms "a," "an," and "the" include plural referents. the term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 1991 edition of the Annual Book of ASTM Standards unless otherwise indicated. All cited references are incorporated herein by reference.

Preferred polyesters are obtained by copolymerizing a glycol component and an acid component comprising at least 70 mole %, preferably at least 80 mole %, of terephthalic acid, or polyester-forming derivatives thereof. The preferred glycol, tetramethylene glycol, component can contain up to 30 mole %, preferably up to 20 mole % of another glycol, such as ethylene glycol, trimethylene glycol, 2-methyl-1,3-propane glycol, hexamethylene glycol, decamethylene glycol, cyclohexane dimethanol, neopentylene glycol, and the like, and mixtures comprising at least one of the foregoing glycols. The preferred acid component can contain up to 30 mole %, preferably up to 20 mole %, of another acid such as isophthalic acid, 2,6-naphthalene dicarboxylic acid, 2,7-naphthalene dicarboxylic acid, 1,5-naphthalene dicarboxylic acid, 4,4'-diphenyl dicarboxylic acid, 4,4'-diphenoxyethanedicarboxylic acid, sebacic acid, adipic acid, and the like, and polyester-forming derivatives thereof, and mixtures comprising at least one of the foregoing acids or acid derivatives.

In one embodiment, the polyester is poly(ethylene terephthalate), poly(1,4-butylene terephthalate), poly(ethylene naphthalate), poly(1,4-butylene naphthalate), (polytrimethylene terephthalate), poly(1,4-cyclohexylenedimethylene 1,4-cyclohexanedicarboxylate), poly(1,4-cyclohexylenedimethylene terephthalate), poly(1,4-butylene-co-1,4-but-2-ene diol terephthalate), and/or poly(cyclohexylenedimethylene-co-ethylene terephthalate). Specifically, the polyester is poly(1,4-butylene terephthalate).

A preferred polyester can have a number average molecular weight of 10,000 atomic mass units (a.m.u.) to 200,000 a.m.u., as measured by gel permeation chromatography using polystyrene standards. Within this range, a number average molecular weight of at least 20,000 a.m.u is preferred. Also within this range, a number average molecular weight of up to 100,000 a.m.u is preferred, and a number average molecular weight of up to 50,000 a.m.u is more preferred. In a specific embodiment, the polyester has a weight average molecular weight of greater than 45,000 a.m.u, specifically a poly(butylene terephthalate) having a weight average molecular weight of greater than 45,000 a.m.u.

The polyester can be present in the composition in an amount from 20 to 90 weight percent (wt %), based on the total weight of the composition. Within this range, it is preferred to use at least 25 weight percent, even more preferably at least 30 weight percent of the polyester such as poly(butylene terephthalate). In one embodiment, the polyester is present in an amount of 20 to 80 weight percent, based on the total weight of the composition, specifically 35 to 65 weight percent, even more specifically 40 to 65 weight percent, each based on the total weight of the composition.

In a further embodiment the composition can contain a second polyester resin that is different from the first polyester. For the second polyester, suitable resins include those derived from a $C_2$-$C_{10}$ aliphatic or cycloaliphatic diol, or mixtures thereof, and at least one aromatic dicarboxylic acid. Preferred polyesters are derived from an aliphatic diol and an aromatic dicarboxylic acid having repeating units of the following general formula: wherein n is an integer of from 2 to 6, and R is a $C_6$-$C_{20}$ divalent aryl radical comprising a decarboxylated residue derived from an aromatic dicarboxylic acid.

Examples of aromatic dicarboxylic acids represented by the decarboxylated residue R are isophthalic acid, terephthalic acid, 1,2-di(p-carboxyphenyl)ethane, 4,4'-dicarboxydiphenyl ether, 4,4'-bisbenzoic acid, and the like, and mixtures thereof. All of these acids contain at least one aromatic nucleus. Acids containing fused rings can also be present, such as in 1,4-, 1,5-, or 2,6-naphthalene dicarboxylic acids. Preferred dicarboxylic acids include terephthalic acid, isophthalic acid, naphthalene dicarboxylic acids, and the like, and mixtures comprising at least one of the foregoing dicarboxylic acids.

The aliphatic or alicyclic polyols include glycols, such as ethylene glycol, propylene glycol, butanediol, hydroquinone, resorcinol, trimethylene glycol, 2-methyl-1,3-propane glycol, 1,4-butanediol, hexamethylene glycol, decamethylene glycol, 1,4-cyclohexane dimethanol, or neopentylene glycol.

Also contemplated herein are the above polyesters with minor amounts, e.g., 0.5 to 30 percent by weight, of units derived from aliphatic acids and/or aliphatic polyols to form copolyesters. The aliphatic polyols include glycols, such as poly(ethylene glycol). Such polyesters can be made following the teachings of, for example, U.S. Pat. No. 2,465,319 to Whinfield et al., and U.S. Pat. No. 3,047,539 to Pengilly.

Block copolyester resin components are also useful, and can be prepared by the transesterification of (a) straight or branched chain poly(alkylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols. Especially useful when high melt strength is important are branched high melt viscosity resins, which include a small amount of, e.g., up to 5 mole percent based on the acid units of a branching component containing at least three ester forming groups. The branching component can be one that provides branching in the acid unit portion of the polyester, in the glycol unit portion, or it can be a hybrid branching agent that includes both acid and alcohol functionality. Illustrative of such branching components are tricarboxylic acids, such as trimesic acid, and lower alkyl esters thereof, and the like; tetracarboxylic acids, such as pyromellitic acid, and lower alkyl esters thereof, and the like; or preferably, polyols, and especially preferably, tetrols, such as pentaerythritol; triols, such as trimethylolpropane; dihydroxy carboxylic acids; and hydroxydicarboxylic acids and derivatives, such as dimethyl hydroxyterephthalate, and the like. Branched poly(alkylene terephthalate) resins and their preparation are described, for example, in U.S. Pat. No. 3,953,404 to Borman. In addition to terephthalic acid units, small amounts, e.g., from 0.5 to 15 mole percent of other aromatic dicarboxylic acids, such as isophthalic acid or naphthalene dicarboxylic acid, or aliphatic dicarboxylic acids, such as adipic acid, can also be present, as well as a minor amount of diol component other than that derived from 1,4-butanediol, such as ethylene glycol or cyclohexylenedimethanol, etc., as well as minor amounts of trifanctional, or higher, branching components, e.g., pentaerythritol, trimethyl trimesate, and the like.

In a specific embodiment, the poly(1,4-butylene terephthalate) can be combined with more than 0 to 30, i.e., up to 30 weight percent (wt %) of one or more of any of the foregoing different polyesters.

The flame retardant polyester composition includes a flame retarding quantity of one or a mixture of nitrogen-containing flame retardants such as triazines, guanidines, cyanurates, and isocyanurates. Preferred triazines have the formula wherein $R^1$, $R^2$, and $R^3$ are independently $C_1$-$C_{12}$ alkyl, $C_1$-$C_{12}$ alkoxyl, $C_6$-$C_{12}$ aryl, amino, $C_1$-$C_{12}$ alkyl-substituted amino, or hydrogen. Highly preferred triazines include 2,4,6-triamine-1,3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid can be used in the composition. Examples include melamine pyrophosphate and melamine polyphosphate. Preferred cyanurate/isocyanurate compounds include salts/adducts of the triazine compounds with cyanuric acid, such as melamine cyanurate and any mixtures of melamine salts.

Preferred guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame retardant can be present in the composition at 1 to 25 weight percent, based on the total weight of the composition. Within this range, it is preferred to use at least 5 weight percent, even more preferably at least 8 weight percent of the nitrogen-containing flame retardant. Also within this range, it is preferred to use up to 20 weight percent.

In a specific embodiment, it has been found advantageous to use from 1 to 25 wt % of a melamine polyphosphate, melamine cyanurate, melamine pyrophosphate, and/or melamine phosphate, based on the total weight of the composition. Particularly good results are obtained using from 1 to 25 wt % of a melamine polyphosphate and/or melamine cyanurate, specifically 8 to 20 wt % of melamine polyphosphate and/or melamine cyanurate, based on the total weight of the composition.

The nitrogen-containing flame-retardants are used in combination with one or more phosphinic acid salts. The phosphinates and diphosphinates include those set forth in U.S. Pat. No. 6,255,371 to Schosser et al. The specification of this patent, column 1, line 46 to column 3 line 4 is incorporated by reference into the present specification. Specific phosphinates mentioned include aluminum diethylphosphinate (DE-PAL), and zinc diethylphosphinate (DEPZN). The phosphinates have the formula (I) $[(R^1)(R^2)(PO)—O]_m^- M^{m+}$ and formula II $[(O—POR^1)(R^3)(POR^2—O)]_2^{2-} M^{m+}$, and/or polymers comprising such formula I or II, wherein $R^1$ and $R^2$ are identical or different and are H, $C_1$-$C_6$-alkyl, linear or branched, or $C_6$-$C_{10}$-aryl; $R^3$ is $C_1$-$C_{10}$-alkylene, linear or branched, $C_6$-$C_{10}$-arylene, -alkylarylene or -arylalkylene; M is an alkaline earth metal, alkali metal, Al, Ti, Zn, Fe, or boron; m is 1, 2, 3 or 4; n is 1, 2, or 3; and x is 1 or 2. In one embodiment $R^1$ and $R^2$ are the same and are C1-C6-alkyl, linear or branched, or phenyl; $R^3$ is $C_1$-$C_{10}$-alkylene, linear or branched, $C_6$-$C_{10}$-arylene, -alkylarylene or -arylalkylene; M is magnesium, calcium, aluminum or zinc; m is 1, 2 or 3; n is 1, 2 or 3; and x is 1 or 2. The structures of formulas I and II are specifically incorporated by reference from the Schosser patent into the present application. Note that $R^1$ and $R^2$ can be H, in addition to the substituents referred to set forth in the patent. This results in a hypophosphite, a subset of phosphinate, such as calcium hypophosphite, aluminum hypophosphite, and the like.

In a specific embodiment, the composition comprises from 1 to 25 wt %, specifically from 7 to 20 wt % of a flame retardant phosphinate of the formula (Ia)

$$[(R^1)(R^2)(PO)—O]_3^- Al^{3+} \quad (Ia),$$

a flame retardant diphosphinate of the formula (IIa)

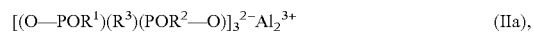

$$[(O—POR^1)(R^3)(POR^2—O)]_3^{2-} Al_2^{3+} \quad (IIa),$$

a flame retardant polymer comprising formula (Ia) or (IIa), wherein $R^1$ and $R^2$ are identical or different and are H, $C_1$-$C_6$-alkyl, linear or branched, or $C_6$-$C_{10}$-aryl; $R^3$ is $C_1$-$C_{10}$-alkylene, linear or branched, $C_6$-$C_{10}$-arylene, -alkylarylene or -arylalkylene;

The charring polymer is a polymer that has not more than 85% weight loss at 400-500° C. upon heating under nitrogen using a thermogravimetric analysis (TGA) at a heating rate of 20° C. per minute. Typical charring polymers include polyetherimides, poly(phenylene ether), poly(phenylenesulfide), polysulphones, polyethersulphones, poly(phenylenesulphide oxide (PPSO), and polyphenolics (e.g., Novolac). The charring polymer is present in an amount from 0.1 to 15 percent by weight of the composition. In a specific embodiment, a polyetherimide is used, specifically an aromatic polyetherimide. The polyetherimide is present in an amount from more than 0 to 25 wt %, specifically 0.1 to 25 wt %, even more specifically from 2 to 8 wt %, each based on the total weight of the composition. It has unexpectedly been found that the presence of a polyetherimide in compositions comprising aluminum phosphinate salts improve the mechanical properties of the compositions, in particular tensile strength and impact properties. High temperature molding stability is also improved, as well as melt stability.

The compositions may, optionally, further comprise a reinforcing filler. Suitable reinforcing fillers include silica; silicates such as talc or mica; carbon black; and reinforcing fibers, such as carbon fiber, aramide fiber, glass fiber, and the like; and mixtures comprising at least one of the foregoing fillers. In a preferred embodiment, the reinforcing filler comprises glass fibers. For compositions ultimately employed for electrical uses, it is preferred to use fibrous glass fibers comprising lime-aluminum borosilicate glass that is relatively soda free, commonly known as "E" glass. However, other glasses are useful where electrical properties are not so important, e.g., the low soda glass commonly known as "C" glass. The glass fibers can be made by standard processes, such as by steam or air blowing, flame blowing and mechanical pulling. Preferred glass fibers for plastic reinforcement can be made by mechanical pulling. The diameter of the glass fibers is generally 1 to 50 micrometers, preferably 1 to 20 micrometers. Smaller diameter fibers are generally more expensive, and glass fibers having diameters of 10 to 20 micrometers presently offer a desirable balance of cost and performance. The glass fibers can be bundled into fibers and the fibers bundled in turn to yarns, ropes or rovings, or woven into mats, and the like, as is required by the particular end use of the composition. In preparing the molding compositions, it is convenient to use the filamentous glass in the form of chopped strands of one-eighth to 2 inches long, which usually results in filament lengths between 0.0005 to 0.25 inch (0.0127 to 6.35 mm) in the molded compounds. Such glass fibers are normally supplied by the manufacturers with a surface treatment compatible with the polymer component of the composition, such as a siloxane, titanate, or polyurethane sizing, or the like.

When present in the composition, the reinforcing filler can be used at 10 to 60 weight percent, based on the total weight of the composition. Within this range, it is preferred to use at least 20 weight percent of the reinforcing filler. Also within this range, it is preferred to use up to 50 weight percent, more preferably up to 40 weight percent, of the reinforcing filler.

In another embodiment, the composition comprises more than 0 to 50 wt % of a reinforcing filler, specifically from 15 to 45 wt., more specifically from 20 to 35 wt % of a reinforcing filler, based on the total weight of the composition. In another embodiment, the composition comprises 10 to 30 wt % of a reinforcing filler, or, alternatively, depending on the end use of the composition, from 30 to 50 wt % of a reinforcing filler. In the foregoing embodiment, the reinforcing filler is a particulate filler, a glass fiber, and a combination thereof.

The composition can further comprise one or more anti-dripping agents, which prevent or retard the resin from dripping while the resin is subjected to burning conditions. Specific examples of such agents include silicone oils, silica (which also serves as a reinforcing filler), asbestos, and fibrillating-type fluorine-containing polymers. Examples of fluorine-containing polymers include fluorinated polyolefins such as, for example, poly(tetrafluoroethylene), tetrafluoroethylene/hexafluoropropylene copolymers, tetrafluoroethylene/ethylene copolymers, polyvinylidene fluoride, poly(chlorotrifluoroethylene), and the like, and mixtures comprising at least one of the foregoing anti-dripping agents. A preferred anti-dripping agent is poly(tetrafluoroethylene). When used, an anti-dripping agent is present in an amount of 0.02 to 2 weight percent, and more preferably from 0.05 to 1 weight percent, based on the total weight of the composition.

The compositions may, optionally, further comprise other conventional additives used in polyester polymer compositions such as non-reinforcing fillers, stabilizers such as antioxidants, thermal stabilizers, radiation stabilizers, and ultraviolet light absorbing additives, mold release agents, plasticizers, quenchers, lubricants, antistatic agents and processing aids. Other ingredients, such as dyes, pigments, laser marking additives, and the like can be added for their conventionally employed purposes. A combination comprising one or more of the foregoing or other additives can be used.

In an advantageous feature, it has been found that flame retardancy can be achieved substantially in the absence of a halogenated, in particular a chlorinated and/or brominated organic flame retardant compound. In one embodiment, the compositions comprise 0 to 5 wt % of a chlorinated and/or brominated organic compound. In another embodiment, the compositions comprise 0 to less than 3 wt % of a chlorinated and/or brominated organic compound. In still another embodiment, the compositions comprise less than 2000 ppm, less than 500 ppm, or less than 100 ppm of a chlorinated and/or brominated organic flame retardant compound.

In another embodiment, where it is important to make compositions having a light color or a white appearance, a composition can further include a mixture of zinc sulfide and zinc oxide in sufficient amounts to produce a composition having a light grey appearance or a white appearance. The specific amounts of mixtures of zinc sulfide and zinc oxide can vary, depending on the application. In one embodiment, the zinc sulphide is present in an amount that is at least 1 weight percent, based on the total weight of the composition. In another embodiment, the zinc oxide is present in an amount that is at least 0.05 weight percent, based on the total weight of the composition. In another embodiment, the zinc sulphide is present in an amount ranging from 1 to 14 weight percent, based on the total weight of the composition. In another embodiment, the zinc oxide is present in an amount ranging from 0.05 to 1 weight percent, based on the total weight of the composition. The light gray or white composition can have LAB values that can vary. As further discussed below, the use of the mixture of zinc sulfide and zinc oxide produces a material of light gray or white appearance that does not emit an unpleasant odor that results from the formation of hydrogen sulfide.

In a specific embodiment, any compound added to quench the odor of the compositions does not significantly adversely affect the desired physical properties of the compositions, for example flame retardance, processing characteristics, impact strength, brittleness, and the like.

Other additives that can be used to quench the odor of the compositions, in particular sulfur-based odors, include silicon-containing compounds, for example organosilanes, organosilicones, and organosiloxanes. It has been found that effective silicon-containing compounds have a reactive group, e.g., amino groups, sulfhydryl groups, and reactive silicon-containing groups such as silicon hydride groups, alkoxysilyl groups such as trialkoxysilyl groups, dialkoxyalkylsilyl groups and allcoxydialkylsilyl groups, acyloxysilyl groups, and the like. Specific exemplary silicon-containing compounds include organosilanes, including amino-functional organotrialkoxysilanes, organosiloxanes containing a reactive hydride (i.e., an Si—H group), epoxy-modified silicones, and the like.

An organosilane has the general chemical formula $R_nSiR'_m$ where n is 1-3, specifically 1, and m is 4−n, R is a non hydrolyzable organic functional group (e.g., a C1-C14 hydrocarbon containing vinyl, epoxy, amino, methacryl, acryl, isocyanato, thiocyanato, mercapto, chloro, and the like), and R' a hydrolyzable group (e.g., acetoxy, alkoxy, chloro, hydride, and the like). The $C_{1-14}$ hydrocarbon can be a $C_{1-6}$ alkylene. Exemplary silanes include 3-methacryloxypropyltrimethoxysilane, 3-aminopropyl trialkoxysilanes such as 3-aminopropyl trimethoxysilane and 3-aminopropyl triethoxysilane, 3-glycidoxypropyltrimethoxysilane, trimethoxy vinylsilane, and poly(vinylmethoxysiloxane). Further, the alkoxysilane can be a bis(trialkoxysilane), for example an alkylene or polydimethylsilane chain terminated with —$SiOR'_3$ groups. The alkoxysilane can be at least partially hydrolyzed, for example a partially hydrolyzed tetraalkoxysilane or a hydrolyzed alkyl trialkoxy silane or aminoalkyl trialkoxy silane, can be used.

Organosiloxanes containing a reactive hydride include polydiorganosiloxanes of the formula $ZSiR_2$—$[OSiHR]_d$—$[OSiR_2]_e$—$OSiR_2Z$ wherein d has an average value from 0 to 10,000, e has an average value from 1 to 10,000, Z is hydrogen or R, and each R is independently a $C_{1-13}$ monovalent organic group, provided that at least one Z is hydrogen when d is zero. R can independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. Combinations of the foregoing R groups can be used in the same polymer. In one embodiment, R is methyl, trifluoromethyl, or phenyl; alternatively, each R is methyl. In a specific embodiment, the reactive silicone is a poly(methyl hydrogensiloxane) wherein each Z is R, more specifically methyl, and d and e have an average value from 10 to 10,000. Specifically, d has an average value from 10 to about 100. The value of d and e can be selected so as to provide a silicone fluid. Suitable fluids have a viscosity of 1 to about 50 cSt at 25°. The ratio of d:e units can be from 1:99 to 90:10, specifically from 10:90 to 50:50.

In a specific embodiment, a linear silicon hydride is of the formula

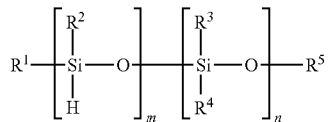

wherein m≧1 and (m+n)=1-10,000; $R^1$ and $R^2$ is each independently a hydrogen or $C_1$-$C_{13}$ alkyl, $C_1$-$C_{13}$ haloalkyl, $C_1$-$C_{13}$ alkoxy, $C_6$-$C_{14}$ aryl, $C_6$-$C_{14}$ haloaryl, $C_6$-$C_{10}$ aryloxy, $C_7$-$C_{13}$ alkylaryl, or $C_7$-$C_{13}$ haloalkylaryl; $R^3$ and $R^4$ is each independently a $C_1$-$C_{13}$ alkyl, $C_1$-$C_{13}$ haloalkyl, $C_1$-$C_{13}$ alkoxy, $C_6$-$C_{14}$ aryl, $C_6$-$C_{14}$ haloaryl, $C_6$-$C_{10}$ aryloxy, $C_7$-$C_{13}$ alkylaryl, $C_7$-$C_{13}$ haloalkylaryl, or $C_7$-$C_{13}$ alkylaryloxy; $R^5$ is a hydrogen, $C_1$-$C_{13}$ alkyl, $C_1$-$C_{13}$ haloalkyl, $C_6$-$C_{14}$ aryl, $C_6$-$C_{14}$ haloaryl, $C_7$-$C_{13}$ alkylaryl, or $C_7$-$C_{13}$ haloalkylaryl. In a specific embodiment, $R^1$ and $R^2$ is each independently hydrogen, methyl, ethyl, propyl, trifluoropropyl, phenyl, ethylphenyl, methoxy, ethoxy or phenoxy; $R^3$ and $R^4$ is each independently a methyl, ethyl, propyl, trifluoropropyl, phenyl, ethylphenyl, methoxy, ethoxy or phenoxy; and $R^5$ is a hydrogen, methyl, ethyl, propyl, trifluoropropyl, phenyl, or ethylphenyl.

In another specific embodiment, a cyclic silicon hydride is of the formula

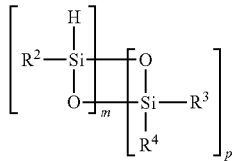

wherein m≧1 and (m+p)=3-1000; $R^2$ is a hydrogen or $C_1$-$C_{13}$ alkyl, $C_1$-$C_{13}$ haloalkyl, $C_1$-$C_{13}$ alkoxy, $C_6$-$C_{14}$ aryl, $C_6$-$C_{14}$ haloaryl, $C_6$-$C_{10}$ aryloxy, $C_7$-$C_{13}$ alkylaryl, or $C_7$-$C_{13}$ haloalkylaryl; and $R^3$ and $R^4$ is each independently a $C_1$-$C_{13}$ alkyl, $C_1$-$C_{13}$ haloalkyl, $C_1$-$C_{13}$ alkoxy, $C_6$-$C_{14}$ aryl, $C_6$-$C_{14}$ haloaryl, $C_6$-$C_{10}$ aryloxy, $C_7$-$C_{13}$ alkylaryl, $C_7$-$C_{13}$ haloalkylaryl, or $C_7$-$C_{13}$ alkylaryloxy. In a specific embodiment, $R^1$ is hydrogen, methyl, ethyl, propyl, trifluoropropyl, phenyl, or ethylphenyl; and $R^3$ and $R^4$ is each independently a methyl, ethyl, propyl, trifluoropropyl, phenyl, ethylphenyl, methoxy, ethoxy or phenoxy.

Suitable amounts of the silicon-containing quencher are in the range from 0.05 to 2 wt %, specifically from 0.1 to 1 wt %, based on the total weight of the composition.

The compositions can be prepared by a number of procedures. In an exemplary process, the polyester composition, optional amorphous additives, impact modifier and filler and/or reinforcing glass is put into an extrusion compounder with resinous components to produce molding pellets. The resins and other ingredients are dispersed in a matrix of the resin in the process. In another procedure, the ingredients and any reinforcing glass are mixed with the resins by dry blending, and then fluxed on a mill and comminuted, or extruded and chopped. The composition and any optional ingredients can also be mixed and directly molded, e.g., by injection or transfer molding techniques. Preferably, all of the ingredients are freed from as much water as possible. In addition, compounding should be carried out to ensure that the residence time in the machine is short; the temperature is carefully controlled; the friction heat is utilized; and an intimate blend between the resin composition and any other ingredients is obtained.

Preferably, the ingredients are pre-compounded, pelletized, and then molded. Pre-compounding can be carried out in conventional equipment. For example, after pre-drying the polyester composition (e.g., for four hours at 120° C.), a single screw extruder can be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) can be fed downstream. In either case, a generally suitable melt temperature will be 230° C. to 300° C. The pre-compounded composition can be extruded and cut up into molding compounds such as conventional granules, pellets, and the like by standard techniques. The composition can then be molded in any equipment conventionally used for thermoplastic compositions, such as a Newbury type injection molding machine with conventional cylinder temperatures, at 230° C. to 280° C., and conventional mold temperatures at 55° C. to 95° C. The compositions provide an excellent balance of impact strength, and flame retardancy.

In embodiments where the compositions are of a light color or a white color, a composition can be made by a method that includes a method for the manufacture of a composition, which comprises blending the components of the composition and further includes adding a mixture of zinc sulfide and zinc oxide in sufficient amounts (i) to produce a composition having a light grey or white appearance and (ii) to inhibit formation of hydrogen sulfide. Hydrogen sulfide emits a highly undesirable odor and inhibiting the formation of such gas makes the use of such a material highly useful. In one embodiment, the zinc sulphide is present in an amount from 1 to 14 weight percent, based on the total weight of the composition. In another embodiment, the zinc oxide is present in an amount from 0.05 to 1 weight percent, based on the total weight of the composition.

In another embodiment, a composition can be made by a method that includes a method for the manufacture of a composition, which comprises blending the components of the composition and further includes adding an odor reducing additive in an amount effective to reduce the odor of the composition, in particular to reduce the sulfur-based odor of the composition. In addition to zinc sulfide, zinc oxide, and mixtures thereof, a quencher can be used, for example a silicon-containing compound such as a polysiloxane or aminosilane as described above. When present, the silicon-containing compound is used in an amount from 0.05 to 2 weight percent, based on the total weight of the composition.

The compositions can provide excellent flame retardancy when molded into either thick or thin components. For example, a 0.8 mm thick molded sample comprising the composition can have a UL-94 flammability rating of V0. A 0.4 mm thick molded sample comprising the composition can have a UL-94 flammability rating of V0.

In addition to good flame retardancy, the a molded article comprising the composition can have a tensile strength at yield from to 90 to 120 MPa, measured in accordance with ISO 527.

A molded article comprising the composition can have good impact properties, for example, an unnotched Izod impact strength from to 20 to 50 KJ/m2, measured at 23° C. in accordance with ISO 180.

A molded article comprising the composition can have a heat deflection temperature from 175 to 225° C., measured in accordance with ISO 75 at 1.8 MPa.

The composition can further have good tensile properties. A molded article comprising the composition can have a tensile modulus of elasticity from 8.0 to 10.0 GPa, or from 8.0 to 15 GPa, measured in accordance with ISO 527. A molded article comprising the composition can have an elongation at break from 1 to 3%, measured in accordance with ISO 527. A molded article comprising the composition can have a tensile strength at yield from 90 to 120 MPa, measured in accordance with ISO 527.

The compositions are father heat stable. For example, the compositions maintain at least 80% of their initial weight average molecular weight after molding at 265° C., 275° C., or 285° C. Alternatively, or in addition, the composition can have a polydispersity index after molding at 265° C., 275° C., or 285° C. that is from 80% to 120% of the polydispersity index of the composition prior to molding.

In a specific embodiment, the compositions can have a combination of good physical properties. For example, a molded article comprising the composition can have an unnotched Izod impact strength of equal to 20 to 50 KJ/m2, measured at 23° C. in accordance with ISO 180 and a heat deflection temperature from 175 to 225° C., measured in accordance with ISO 75 at 1.8 MPa; and a 0.8 mm thick molded sample comprising the composition can have a UL-94 flammability rating of V0.

One or more of the foregoing properties is achieved by a composition that consists essentially of a poly(1,4-butylene terephthalate); a flame retardant phosphinate of the formula (Ia), (IIa), and/or a flame retardant polymer derived from formula (Ia) or (IIa); melamine polyphosphate and/or melamine cyanurate; an aromatic polyetherimide; and a reinforcing filler. In particular, the foregoing composition achieves good flame retardancy for samples having a thickness of 0.4 and 0.8 mm, and good impact and tensile strength. Better high temperature molding stability and melt stability are also seen.

An additional preferred embodiment encompasses molded articles made from the composition, such as electric and electronic parts, including, for example, connectors, circuit breakers, and power plugs. Injection molded articles can be specifically mentioned, for example an injection molded connector.

It should be clear that the invention encompasses reaction products of the above described compositions.

The invention is further illustrated by the following non-limiting examples.

EXAMPLES AND COMPARATIVE EXAMPLES

Examples 1-5 and Comparative Examples A-G

Formulations A-G and 1-5 below were made by dry-blending of ingredients with the exception of tetraphenyl BPA-diphosphate (BPA-DP) and glass fiber. The blends are subsequently compounded on a Werner-Pfleiderer 25 mm co-rotating extruder, where BPA-DP and glass were fed separately downstream of the blend. The extruder temperature settings (upstream to downstream) were 50-140-265-260-260-260-260-260-275° C.; a vacuum of 0.45 bar was applied and the screw rotation rate was 300 RPM.

Molding of parts was performed on a 35 ton Engel injection molding machine with temperature settings of 245-255-265-265° C. (from throat to nozzle) and a mold temperature of 70° C. for the PBT-based formulations. Prior to molding the pellets were pre-dried at 120° C. for 2-4 hrs.

Test specimens were evaluated for Izod unnotched Impact (IUI) strength in accordance with ISO 180, and results are expressed in units of kJ/m$^2$. UL94 testing was employed for the flame retardance testing. The tensile strength was evaluated using ISO527. The polybutylene terephthalate (PBT) employed was PBT-315 and PBT-195, both from Sabic, and used in the weight ratio of 2:1. MC-25 is melamine cyanurate from Ciba. TSAN is available from Sabic, and is a fibrillating type Teflon in styrene acrylonitrile. BPA-DP is bisphenol A diphosphate from Albemarle. PPO is polyphenylene oxide from GE (polyphenylene ether of 2,6-xylenol). Ultem 1010 is polyetherimide from GE. Standard stabilizers are used such as Irganox 1010 and/or epoxy. Standard pigments employed include zinc sulfide.

TABLE 1

| Component | A | B | C | 1 | 2 | D | E | 3 | F | 4 | G | 5 |
|---|---|---|---|---|---|---|---|---|---|---|---|---|
| PBT | 33.55 | 33.55 | 41.55 | 36.55 | 36.55 | 45.55 | 47.55 | 41.55 | 51.55 | 47.55 | 49.35 | 42.35 |
| MC-25 | 10 | 10 | 12.5 | 12.5 | 12.5 | 10 | 10 | 10 | 10 | 10 | 10 | 10 |
| TSAN | 0.50 | 0.5 | 0.5 | 0.5 | 0.5 | 0.5 | 0.5 | 0.5 | 0.5 | 0.5 | 0.5 | 0.5 |
| ULTEM-1010 | 5 | — | — | 5 | — | — | — | 5 | — | 5 | — | 5 |
| PPO-803 | — | 5 | — | — | 5 | — | — | — | — | — | — | — |
| BPA-DP | 18 | 18 | — | — | — | — | — | — | — | — | — | — |
| Zn salt of diethylphophonic acid | — | — | 12.5 | 12.5 | 12.5 | 15 | 15 | 15 | 10 | 10 | — | — |
| Calcium hypophosphite | — | — | — | — | — | — | — | — | — | — | 15 | 15 |
| Stabilizers | 1.15 | 1.15 | 1.15 | 1.15 | 1.15 | 1.15 | 1.15 | 1.15 | 1.15 | 1.15 | 1.15 | 1.15 |
| Pigments | 1.8 | 1.8 | 1.8 | 1.8 | 1.8 | 1.8 | 1.8 | 1.8 | 1.8 | 1.8 | 1.8 | 1.8 |
| Glass fiber | 30 | 30 | 30 | 30 | 30 | 25 | 25 | 25 | 25 | 25 | 25 | 25 |

TABLE 1-continued

|  | A | B | C | 1 | 2 | D | E | 3 | F | 4 | G | 5 |
|---|---|---|---|---|---|---|---|---|---|---|---|---|
| Properties | | | | | | | | | | | | |
| IUI (kJ/m$^2$) | 35.1 | 29.1 | 22.4 | 22.6 | 14.2 | 24.9 | 27 | 30.5 | 35.1 | 37.6 | 28.4 | 24 |
| UL rating at 1.5 mm | V0 | NC | V0 | V0 | V0 | V1 | V1 | V0 | NR | V1 | V1 | V0 |
| UL rating at 0.8 mm | — | — | V1 | V0 | V0 | V2 | V2 | V1 | NR | NR | V2 | V2 |
| Tensile strength retention after 1 week of aging at 140° C. | <50% | <50% | >80% | >80% | >80% | >80% | >80% | >80% | >80% | >80% | >80% | >80% |

Comparative samples A and B show that by using a phosphorus-containing compound such as BPA-DP good thermal stability is not obtained, as the tensile strength retention after 1 week at 140 C is lower than 50%. For the formulations based on a phosphinate, the retention is higher than 80%.

Examples 1 and 2, in accordance with the invention, show that the UL-performance at 0.8 mm is V0, in contrast with comparative sample C. The addition of a charring polymer therefore gives better UL-performance, while the tensile strength retention is still good. Polyetherimide (ULTEM from Sabic) is preferred over polyphenylene ether (PPO from Sabic), due to the higher impact values of the compositions containing the polyetherimide.

Upon using lower amounts of melamine cyanurate it can be seen that the impact improves, but a charring polymer (Example 3) is needed to maintain a V0 performance at 1.5 mm; the comparative samples D and E result only in a V1 performance. Upon further lowering the flame retardant amounts, in this case the phosphinate amount, it can be seen that the UL-performance drops to NC (non-classified) or NR (not rated) for comparative sample F, but for sample 4 the material still has a V1 performance. Also in the case of calcium hypophosphite (calcium phosphinate) addition of a charring polymer (Example 5) result in better UL-performance without negative effects on the tensile strength retention.

From the results it can be concluded that a combination of a phosphinate compound with a charring polymer, in the presence of a nitrogen compound, gives the best balance in properties as UL-performance and tensile strength retention upon oven aging. Without the charring agent or in case of another phosphorus compound (as BPA-DP) these results could not be obtained.

Examples 6-9 and Comparative Examples H-J

Materials

The components shown in Table 2 were used in Examples 6-9 and Comparative Examples H-J.

TABLE 2

| Component | Description | Source |
|---|---|---|
| PBT 195/315 | Polybutylene terephthalate | Sabic |
| OP 1240 | Aluminum phosphinate | Ticona/Clariant |
| MPP | Melamine polyphosphate | Ciba |
| MC | Melamine cyanurate | Ciba |
| ULTEM ™ Resin | Aromatic polyetherimide | Sabic |
| Irganox 1010 | Antioxidant | Ciba |
| TSAN | Teflon encapsulated with styrene acrylonitrile | Sabic |
| PETS | Pentaerythritol tetrastearate | |
| NEG Glass T120 | Glass fibers | Nippon |

All of the formulations for these examples were dry blended and extruded in a 25 mm Werner & Pfleiderer ZSK co-rotating twin screw extruder with a vacuum vented mixing screw, using a screw speed of 300 rpm. Glass fibers were added through a side feeder in the fifth barrel. The temperature profile for compounding starting from feed zone to die zone was 100-200-230-250-265-265-265-270-270-270° C. The desired torque was maintained during the extrusion by changing the throughput rate to achieve optimum mixing. The extrudate was cooled through a water bath prior to pelletization. The pellets were dried for 4 hours at 120° C. in a forced air-circulating oven prior to injection molding.

Test specimens were injection molded on a 100 Ton L&T Demag injection molding machine as per ISO test protocols. The temperature profile for injection molding starting from feed zone to nozzle was 100-250-260-265-270° C. Tensile properties of the injection molded specimens were evaluated as per ISO 527 and unnotched Izod impact testing was performed in accordance with ISO 180. Flame testing was performed with both 1.5 mm and 0.8 mm thickness flame bars in accordance with UL-94. HDT was measured in flat wise direction as per ISO 75 at a heating rate of 120° C./hr.

Table 3 shows the mechanical, thermal, and flame retardant properties of different formulations containing aluminum phosphinate, MPP, MC and with or without an aromatic polyetherimide (Examples 6-7 and Comparative Examples H-I). Table 3 also shows different formulations, as well as different formulations containing aluminum phosphinate, an aromatic polyetherimide, and with or without a melamine compound (Examples 8-9 and Comparative Example J).

TABLE 3

|  | Ex 6 | CEx H | CEx I | Ex 7 | Ex 8 | Ex 9 | CEx J |
|---|---|---|---|---|---|---|---|
| Component | | | | | | | |
| PBT-195 | 49.20 | 54.20 | 51.20 | 54.20 | 51.70 | 49.20 | 54.20 |
| OP 1240 | 15.00 | 15.00 | 15.00 | 15.00 | 15.00 | 20.00 | 20.00 |
| Ultem | 5.00 | 0 | 0 | 5.00 | 7.50 | 5 | 0 |
| MPP | 5.00 | 5.00 | 0 | 0 | 0 | 0 | 0 |
| MC | 0 | 0 | 7.50 | 0 | 0 | 0 | 0 |
| TSAN | 0.5 | 0.5 | 0.5 | 0.5 | 0.5 | 0.5 | 0.5 |
| Irganox 1010 | 0.1 | 0.1 | 0.1 | 0.1 | 0.1 | 0.1 | 0.1 |

TABLE 3-continued

|  | Ex 6 | CEx H | CEx I | Ex 7 | Ex 8 | Ex 9 | CEx J |
|---|---|---|---|---|---|---|---|
| PETS | 0.2 | 0.2 | 0.2 | 0.2 | 0.2 | 0.2 | 0.2 |
| Glass NEG T120 | 25.0 | 25.00 | 25.00 | 25.0 | 25.0 | 25.0 | 25.0 |
| Properties |  |  |  |  |  |  |  |
| Tensile Modulus (GPa) | 10.3 | 10.7 | 10.3 | 9.97 | 9.2 | 10.7 | 9.5 |
| Tensile Strength (MPa) | 102 | 83 | 80 | 100 | 97 | 92.5 | 80 |
| Elongation at break (%) | 1.8 | 1.75 | 1.7 | 1.7 | 1.8 | 1.7 | 1.6 |
| Izod, unnotched (KJ/m$^2$) | 34.3 | 23.3 | 18 | 35 | 34.6 | 29.0 | 22 |
| UL-94 Flame at 1.5 mm | V0 | V0 | V0 | V0 | V0 | V0 | V0 |
| UL-94 Flame at 1.2 mm | V0 | V0 | V0 | V0 | V0 | V0 | V0 |
| UL-94 Flame at 1.0 mm | V0 | V0 | V0 | V0 | V0 | V0 | V1 |
| UL-94 Flame at 0.8 mm | V0 | V0 | V0 | V1 | V1 | V1 | V1 |
| HDT at 1.8 MPa | 207 | 207 | 210 | 206 | 200 | 208 | 207 |

Example 6 had 5 wt % ULTEM™ Resin and 5 wt % of MPP, and a tensile strength and impact strength of 100 MPa and 34 KJ/m$^2$ respectively. Comparative examples H and I contained no polyetherimide, and in both compositions poor tensile strength and low impact strength are observed. Addition of 5 wt % of an aromatic polyetherimide improved the impact strength of the compositions by 40-50% and their tensile strength by 25-35%.

Examples 7-8 contain 5-7.5% polyetherimide, and again, the mechanical properties are much better than in Comparative Example H, which contained no polyetherimide. In particular, use of an aromatic polyetherimide in the formulations improved tensile strength by 25-35% and impact strength by 40-50%.

High temperature molding properties of three of the above examples are shown in Table 4.

TABLE 4

| CEx I |  |  |  |  |
|---|---|---|---|---|
| (AlP/Ultem/MC = 15/0/7.5) |  |  |  |  |
| Injection Molding Temp (° C.) | 265 | 275 | 285 | 295 |
| Tensile Modulus (GPa) | 10.2 | 10.4 | 10 | 9.8 |
| Tensile Strength (MPa) | 76.5 | 68 | 67 | 54 |
| Elongation a break (%) | 1.3 | 1.1 | 1.1 | 0.8 |
| Izod, unnotched impact (KJ/m$^2$) | 18.60 | 16.2 | 14.9 | 10.5 |
| Mn | 13500 | 11400 | 11300 | 9800 |
| Mw | 39100 | 33700 | 33000 | 28700 |
| PDI | 2.9 | 2.9 | 2.9 | 2.9 |
| Ex 6 |  |  |  |  |
| (AlP/Ultem/MPP = 15/5/5) |  |  |  |  |
| Injection Molding Temp (° C.) | 265 | 275 | 285 | 295 |
| Tensile Modulus (GPa) | 9.4 | 10.8 | 11.2 | 11.5 |
| Tensile Strength (MPa) | 100 | 102 | 98.3 | 91.2 |
| Elongation at break (%) | 1.9 | 1.8 | 1.8 | 1.7 |
| Izod, unnotched impact (KJ/m$^2$) | 33.3 | 33.0 | 30.3 | 26.7 |
| Mn | 19465 | 18853 | 18443 | 16882 |
| Mw | 47147 | 46988 | 46762 | 41543 |
| PDI | 2.5 | 2.6 | 2.5 | 2.5 |

As can be seen from the data in Table 4, formulations containing an aromatic polyetherimide retained mechanical properties over a range of molding temperatures employed, thereby rendering these compositions more useful for the manufacture of products in electrical and electronic applications.

Examples 10-18

The purpose of these examples was to evaluate the use of different quenchers to control odor during processing.

Materials

The components shown in Table 5 were used in Examples 10-18.

TABLE 5

| Component | Description | Source |
|---|---|---|
| PBT 195/315 | Polybutylene terephthalate | Sabic |
| OP 1240 | Aluminum phosphinate | Ticona/Clariant |
| MPP | Melamine polyphosphate | Ciba |
| MC | Melamine cyanurate | Ciba |
| ULTEM ™ Resin | Aromatic polyetherimide | Sabic |
| Irganox 1010 | Antioxidant | Ciba |
| TSAN | Teflon encapsulated with styrene acrylonitrile | Sabic |
| PETS | Pentaerythritol tetrastearate |  |
| NEG Glass T120 | Glass fibers | Nippon |
| ZnS | Sachtolith HDS | Sachtleben |
| ZnO | Zinc Oxide | Horsehead |
| NaSt | Sodium Stearate | Baerlocher |
| HALS 770 | bis(2,2,6,6-tetramethyl 4-piperidyl) sebacate | Ciba |
| ADR CESA | Styrene-acrylate-epoxy oligomer | Johnson |
| Fine Talc | Talcum, $Mg_3Si_4O_{10}(OH)_2$ | Internatio BV |
| MH15 | poly(methyl hydrogensiloxane) | GE |

The compositions used in Examples 10-18 were extruded in accordance with procedures and conditions of Examples 1-9. Formulations and results are shown in Table 6.

TABLE 6

|  | 10 | 11 | 12 | 13 | 14 | 15 | 16 | 17 | 18 |
|---|---|---|---|---|---|---|---|---|---|
| PBT | 49.77 | 49.77 | 49.75 | 49.52 | 49.27 | 49.27 | 48.77 | 49.67 | 49.62 |
| TSAN | 0.5 | 0.5 | 0.5 | 0.5 | 0.5 | 0.5 | 0.5 | 0.5 | 0.5 |
| Irganox 1010 | 0.15 | 0.15 | 0.15 | 0.15 | 0.15 | 0.15 | 0.15 | 0.15 | 0.15 |
| PETS | 0.2 | 0.2 | 0.2 | 0.2 | 0.2 | 0.2 | 0.2 | 0.2 | 0.2 |
| MPP | 5 | 5 | 5 | 5 | 5 | 5 | 5 | 5 | 5 |
| OP1240 | 12.5 | 12.5 | 12.5 | 12.5 | 12.5 | 12.5 | 12.5 | 12.5 | 12.5 |
| Ultem 1010-1000 resin - milled | 5 | 5 | 5 | 5 | 5 | 5 | 5 | 5 | 5 |
| Standard Glass | 25 | 25 | 25 | 25 | 25 | 25 | 25 | 25 | 25 |

TABLE 6-continued

|  | 10 | 11 | 12 | 13 | 14 | 15 | 16 | 17 | 18 |
|---|---|---|---|---|---|---|---|---|---|
| ZnS | 1.88 |  | 0.95 | 1.88 | 1.88 | 1.88 | 1.88 | 1.88 | 1.88 |
| ZnO |  | 1.88 | 0.95 |  |  |  |  |  | 0.15 |
| NaSt |  |  |  | 0.25 |  |  |  |  |  |
| HALS 770 |  |  |  |  | 0.5 |  |  |  |  |
| ADR CESA |  |  |  |  |  | 0.5 |  |  |  |
| Fine Talc |  |  |  |  |  |  | 1 |  |  |
| MH 15 |  |  |  |  |  |  |  | 0.1 |  |
| Properties |  |  |  |  |  |  |  |  |  |
| SMELL RATING | 3 | 1 | 1 | 3 | 3 | 3 | 2 | 1 | 1 |
| Processing | Good | Brittle | Brittle | Good | Good | Good | Good | Good | Good |

Smell Rating: - 1: No odor, 2: Poor, 3: Bad

The results in Table 6 indicate that the compositions used in Examples 10-18, which contained an additive that was selected from the group of poly(methyl hydrogensiloxane) fluid or a ZnS/ZnO mixture where ZnO is present in an amount that is less than 0.2 wt % of the composition, yielded odor-free formulations with good processing. The other additives did not perform as well. For instance, Example 10, which contained only ZnS, or Example 11, which contained only ZnO performed poorly. The results indicated that mixtures of ZnS/ZnO mixtures where ZnO is less than 50 wt % of the mixture and poly(methyl hydrogensiloxane) formulations exhibited not only odor-free performance, but also exhibited desirable mechanical properties.

Examples 19-21

The purpose of these examples was to show that mixtures of ZnS/ZnO mixtures and poly(methyl hydrogensiloxane) formulations exhibited not only odor-free performance, but also exhibited desirable mechanical properties.

The compositions used in Examples 19-21 were extruded in accordance to the materials and procedures of Examples 10-18.

TABLE 7

|  | 19 | 20 | 21 |
|---|---|---|---|
| Component |  |  |  |
| PBT 195 | 26.8 | 26.8 | 100 |
| PBT 315 | 24.85 | 24.85 | 24.85 |
| TSAN | 0.5 | 0.5 | 0.5 |
| Irganox 1010 | 0.15 | 0.15 | 0.15 |
| PETS | 0.2 | 0.2 | 0.2 |
| MPP | 5 | 5 | 5 |
| OP1240 | 12.5 | 12.5 | 12.5 |
| Ultem 1010-1000 resin - milled | 5 | 5 | 5 |
| Standard Glass | 25 | 25 | 25 |
| ZnS | 1.88 | 1.88 | 1.88 |
| MH 15 |  | 0.1 |  |
| ZnO |  |  | 0.15 |
| Properties |  |  |  |
| Smell rating | Bad | Acceptable | Acceptable |
| Processing | Good | Good | Good |
| MVR 250C/5 kg/4 min, cm³/10 min | 9.3 | 9.7 | 20 |
| MVR 250C/5 kg/8 min, cm³/10 min | 9.5 | 10.3 | 27 |
| Izod Impact 23° C., N (ISO 180), KJ/m² | 36 | 36 | 21 |
| Modulus (ISO 527), MPa | 10279 | 10105 | 9443 |
| Tensile strength (ISO 527), MPa | 100 | 100 | 76 |
| Elongation at Break (ISO527), % | 2 | 2 | 1.3 |
| UL V0 at 0.8 mm | Pass | Pass | Pass |

The results in Table 7 show that mixtures of ZnS/ZnO mixtures, where ZnO is less than 50% of the mixture, and poly(methyl hydrogensiloxane) formulations exhibited not only odor-free performance, but also exhibited desirable mechanical properties.

While the invention has been described with reference to a preferred embodiment, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising:
   (a) from 20 to 80 wt % of a polyester;
   (b) from 5 to 35 wt % of
      a flame retardant phosphinate of the formula (I)

$$[(R^1)(R^2)(PO)-O]^-_m M^{m+} \quad (I)$$

a flame retardant diphosphinate of the formula (II)

$$[(O-POR^1)(R^3)(POR^2-O)]^{2-}_n M_x^{m+} \quad (II), \text{and/or}$$
   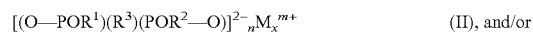

a flame retardant polymer derived from the flame retardant phosphinate of the formula (I) or the flame retardant diphosphinate of the formula (II),
   wherein $R^1$ and $R^2$ are identical or different and are H, C1-C6-alkyl, linear or branched, and/or aryl; $R^3$ is C1-C10, alkylene, linear or branched, C6-C10-arylene, -alkylarylene or -arylalkylene; M is an alkaline earth metal, alkali metal, Al, Ti, Zn, Fe, boron; m is 1, 2, 3 or 4; n is 1, 2, or 3; and x is 1 or 2;
   (c) from 1 to 25 wt % of a melamine polyphosphate, melamine cyanurate, melamine pyrophosphate, and/or melamine phosphate; and
   (d) from about 2 to about 8 wt % of a polyetherimide;
   (e) a quencher component selected from the group consisting of from 0.1 to 1 wt % of poly(methyl hydrogensiloxane), from 0.1 to 1 wt % 3-aminopropyl trialkoxysilane, and mixtures of ZnS and ZnO, wherein the ZnO is present in an amount of less than 50 wt % of the mixture, and combinations thereof;
   wherein an article molded or extruded from the composition has a heat deflection temperature that is equal to or greater than 190° C. and an unnotched Izod impact strength from to 25 to 50 kJ/m² measured at 23° C. in accordance with ISO 180, and a 0.8 mm thick molded sample comprising the composition has a UL-94 flammability rating of V0;
wherein components (a), (b), (c), (d), (e) and optionally an additive component have a combined total weight of 100 wt %.

2. The composition of claim 1, wherein the polyester is selected from the group consisting of poly(ethylene terephthalate), poly(1,4-butylene terephthalate), poly(ethylene naphthalate), poly(1,4-butylene naphthalate), (polytrimethylene terephthalate), poly(1,4-cyclohexylenedimethylene 1,4-cyclohexanedicarboxylate), poly(1,4-cyclohexylene-dimethylene terephthalate), poly(1,4-butylene-co-1,4-but-2-ene diol terephthalate), poly(cyclohexylenedimethylene-co-ethylene terephthalate), and a combination thereof.

3. The composition of claim 2, wherein the polyester is poly(1,4-butylene terephthalate).

4. The composition of claim 3, wherein the poly(1,4-butylene terephthalate) has a weight average molecular weight of 45,000 a.m.u, or greater, as determined by gel permeation chromatography with a polystyrene standard.

5. The composition of claim 3, wherein the composition further comprises more than 0 to 35 wt % of a polyester that is different from the poly(1,4-butylene terephthalate).

6. The composition of claim 1, wherein M is selected from the group consisting of magnesium, calcium, aluminum, zinc, and a combination thereof.

7. The composition of claim 6, wherein M is aluminum.

8. The composition of claim 6, wherein the flame retardant phosphinate of the formula (I) or of the formula (II) is comprises an aluminum phosphinate.

9. The composition of claim 1, wherein polyetherimide is an aromatic polyetherimide.

10. The composition of claim 1, wherein reinforcing filler is present in the composition in an amount from greater than 0 to 50 wt % of the reinforcing filler.

11. The composition of claim 10, wherein the reinforcing filler is present in the composition in an amount from 10 to 30 wt % of the reinforcing filler.

12. The composition of claim 10, wherein the reinforcing filler is present in the composition in an amount from 30 to 50 wt % of the reinforcing filler.

13. The composition of claim 10, wherein the reinforcing filler is selected from the group consisting of particulate fillers, glass fibers, and a combination thereof.

14. The composition of claim 11, wherein the reinforcing filler is selected from the group consisting of particulate fillers, glass fibers, and a combination thereof.

15. The composition of claim 1, wherein the additive component is selected from the group consisting of an antioxidant, a lubricant, a thermal stabilizer, an ultraviolet light absorbing additive, a plasticizer, an anti-dripping agent, a mold release agent, an antistatic agent, a dye, a pigment, a laser marking additive, a radiation stabilizer, and a combination thereof.

16. A method of forming an article, comprising shaping, extruding, calendaring, or molding the composition of claim 1 to form the article.

17. A composition consisting essentially of, based on the total weight of the composition:
from 40 to 65 wt % of a poly(1,4-butylene terephthalate) having a weight average molecular weight of 45,000 a.m.u, or greater, as determined by gel permeation chromatography with a polystyrene standard;
from 7 to 20 wt % of
a flame retardant phosphinate of the formula (Ia)

  (Ia), a flame retardant diphosphinate of the formula (IIa)

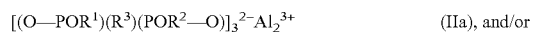  (IIa), and/or a flame retardant polymer comprising formula (Ia) or (IIa),
wherein $R^1$ and $R^2$ are identical or different and are H, C1-C6-alkyl, linear or branched, and/or aryl; $R^3$ is C1-C10, alkylene, linear or branched, C6-C10-arylene, -alkylarylene or -arylalkylene;
from 2 to 8 wt % of melamine polyphosphate and/or melamine cyanurate;
from about 5 to about 7.5 wt % of an aromatic polyetherimide; and
from 20 to 35 wt % of a reinforcing filler.

18. The composition of claim 17, further comprising a quencher component selected from the group consisting of poly(methyl hydrogensiloxane), 3-aminopropyl trialkoxysilane, mixtures of ZnS and ZnO, and combinations thereof in an odor-inhibiting amount that is sufficient to form a composition having a heat deflection temperature that is equal to or greater than 190° C. and an unnotched Izod impact strength from 25 to 50 kJ/m², measured at 23° C. in accordance with ISO 180, and a 0.8 mm thick molded sample comprising the composition has a UL-94 flammability rating of V0.

19. The composition of claim 18, wherein the poly(methyl hydrogensiloxane) and/or the 3-aminopropyl trialkoxysilane are present in an amount from 0.1 to 1 wt % of the total composition.

20. The composition of claim 17, further comprising a chlorinated and/or brominated organic compound that is present in the composition in an amount from more than 0 to less than 5 wt % of the chlorinated and/or brominated organic compound.

21. The composition of claim 20, wherein the chlorinated and/or brominated organic compound is present in the composition in an amount from 0 to less than 3 wt % of the chlorinated and/or brominated organic compound.

22. The composition of claim 20, wherein the chlorinated and/or brominated organic compound is present in the composition in an amount of less than 2000 ppm of the chlorinated and/or brominated organic compound.

23. The composition of claim 17, wherein a molded article comprising the composition has a tensile strength at yield from to 90 to 120 MPa, measured in accordance with ISO 527.

24. The composition of claim 17, wherein a molded article comprising the composition has an unnotched Izod impact strength from to 20 to 50 kJ/m², measured at 23° C. in accordance with ISO 180.

25. The composition of claim 17, wherein a molded article comprising the composition has a heat deflection temperature of from 175 to 225° C., measured in accordance with ISO 75 at 1.8 MPa.

26. The composition of claim 17, wherein a 0.8 mm thick molded sample comprising the composition has a UL-94 flammability rating of V0.

27. The composition of claim 17, wherein a 0.4 mm thick molded sample comprising the composition has a UL-94 flammability rating of V0.

28. The composition of claim 17, wherein a molded article comprising the composition has a tensile modulus of elasticity from 8.0 to 10.0 GPa, measured in accordance with ISO 527.

29. The composition of claim 17, wherein a molded article comprising the composition has an elongation at break from 1 to 3%, measured in accordance with ISO 527.

30. The composition of claim 17, wherein a molded article comprising the composition has a tensile strength at yield from to 90 to 120 MPa, measured in accordance with ISO 527.

31. The composition of claim 17, wherein the composition maintains at least 80% of its initial weight average molecular weight after molding at 265° C., 275° C., or 285° C.

32. The composition of claim 17, wherein composition has a polydispersity index after molding at 265° C., 275° C., or 285° C. that is from 80% to 120% of the polydispersity index of the composition prior to molding.

33. The composition of claim 17, wherein a molded article comprising the composition has an unnotched Izod impact strength of equal to 20 to 50 kJ/m², measured at 23° C. in accordance with ISO 180 and a heat deflection temperature from 175 to 225° C., measured in accordance with ISO 75 at 1.8 MPa; and wherein a 0.8 mm thick molded sample comprising the composition has a UL-94 flammability rating of V0.

34. The composition of claim 17, further comprising a mixture of zinc sulfide and zinc oxide in sufficient amounts to produce a composition having a light grey appearance or a white appearance.

35. The composition of claim 34, wherein the zinc sulfide is present in an amount from 3 to 14 wt %, based on the total weight of the composition.

36. The composition of claim 34, wherein the zinc oxide is present in an amount from 0.05 to 14 wt %, based on the total weight of the composition.

37. A method for the manufacture of a composition, comprising blending the components of the composition of claim 17.

38. The method of claim 37, wherein the method further comprises adding a mixture of zinc sulfide and zinc oxide in sufficient amounts (i) to produce a composition having a light grey or white appearance and (ii) to inhibit formation of hydrogen sulfide.

39. The method of claim 38, wherein the zinc sulfide is present in an amount from 3 to 14 wt %, based on the total weight of the composition.

40. The method of claim 38, wherein the zinc oxide is present in an amount from 0.05 to 14 wt %, based on the total weight of the composition.

41. An article comprising the composition of claim 17.

42. The article of claim 41, wherein the article is an injection molded article.

43. The composition of claim 20, wherein the chlorinated and/or brominated organic compound is present in an amount of less than 500 ppm of the chlorinated and/or brominated organic compound.

44. The composition of claim 20, wherein the chlorinated and/or brominated organic compound is present in an amount of less than 100 ppm of the chlorinated and/or brominated organic compound.

45. A composition consisting essentially of, based on the total weight of the composition:
(a) from 40 to 65 wt % of a poly(1,4-butylene terephthalate) having a weight average molecular weight of 45,000 a.m.u, or greater, as determined by gel permeation chromatography with a polystyrene standard;
(b) from 7 to 20 wt % of
a flame retardant phosphinate of the formula (Ia)

$$[(R^1)(R^2)(PO)-O]^-_m M^{m+} \qquad (I)$$

a flame retardant diphosphinate of the formula (II)

$$[(O-POR^1)(R^3)(POR^2-O)]^{2-}_n M_x^{m+} \qquad (II),$$

and/or $$[(R^1)(R^2)(PO)-O]_3^- Al^{3+} \qquad (Ia),$$

a flame retardant diphosphinate of the formula (IIa)

$$[(O-POR^1)(R^3)(POR^2-O)]_3^{2-} Al_2^{3+} \qquad (IIa),$$

and/or
a flame retardant polymer comprising formula (Ia) or (IIa),
wherein R¹ and R² are identical or different and are H, C1-C6-alkyl, linear or branched, and/or aryl; R³ is C1-C10, alkylene, linear or branched, C6-C10-arylene, -alkylarylene or -arylalkylene; M is an alkaline earth metal, alkali metal, Al, Ti, Zn, Fe, boron; m is 1, 2, 3 or 4; n is 1, 2, or 3; and x is 1 or 2;
(c) from 2 to 8 wt % of melamine polyphosphate and/or melamine cyanurate;
(d) from about 5 to about 7.5 wt % of an aromatic polyetherimide; and
(e) from 20 to 35 wt % of a reinforcing filler;
(f) from 0 to 3 wt % of a chlorinated and/or brominated organic compound; and
wherein components (a), (b), (c), (d), (e), (f), and optionally an additive component have a combined total weight of 100 wt %; and
wherein a molded sample comprising the composition has a tensile strength at yield from 90 to 120 MPa measured in accordance with ISO 527, and an unnotched Izod impact strength from to 25 to 50 kJ/m² measured at 23° C. in accordance with ISO 180, and a 0.8 mm thick molded sample comprising the composition has a UL-94 flammability rating of V0.

\* \* \* \* \*